United States Patent [19]

Martin

[11] 4,001,571
[45] Jan. 4, 1977

[54] LIGHTING SYSTEM
[75] Inventor: Myron D. Martin, Conyers, Ga.
[73] Assignee: National Service Industries, Inc., Atlanta, Ga.
[22] Filed: July 26, 1974
[21] Appl. No.: 492,252
[52] U.S. Cl. .................................. 240/9 R; 174/49; 240/51.11 R; 307/157; 339/28; 339/29 R
[51] Int. Cl.² .................... F21S 7/00; H05B 33/02
[58] Field of Search .... 240/9, 10 T, 10 Q, 51.11 R; 339/28, 29 R; 307/157; 174/49; 52/28

[56] References Cited
UNITED STATES PATENTS

| | | | |
|---|---|---|---|
| 2,484,092 | 10/1949 | Hopgood | 339/28 |
| 2,558,029 | 6/1951 | Wood | 240/10 T |
| 2,576,165 | 1/1951 | Wood | 240/10 T |
| 3,247,368 | 4/1966 | McHugh | 240/51.11 R |
| 3,377,488 | 4/1968 | Lorenzo | 240/51.11 R |
| 3,504,169 | 3/1970 | Freeburger | 240/10 T |
| 3,564,234 | 2/1971 | Phlieger, Jr. | 240/51.11 R |

*Primary Examiner*—Russell E. Adams, Jr.
*Attorney, Agent, or Firm*—Oliver E. Todd, Jr.

[57] ABSTRACT

An improved system for lighting a floor area in a building. A plurality of lighting fixtures mounted in a ceiling structure for lighting the floor area are connected in one or more branch circuits. Each branch circuit is defined by a plurality of plural conductor branch circuit cables which distribute power to the fixtures. Each cable connects in series or parallel to both the next cable and the next fixture in the branch circuit. Circuit connections are easily modified for changing power distribution and switching needs by selective insertion of adapters between two series connected cables or between a cable and a connected fixture. Adapters provide for switching circuits and for converting circuit connections.

15 Claims, 17 Drawing Figures

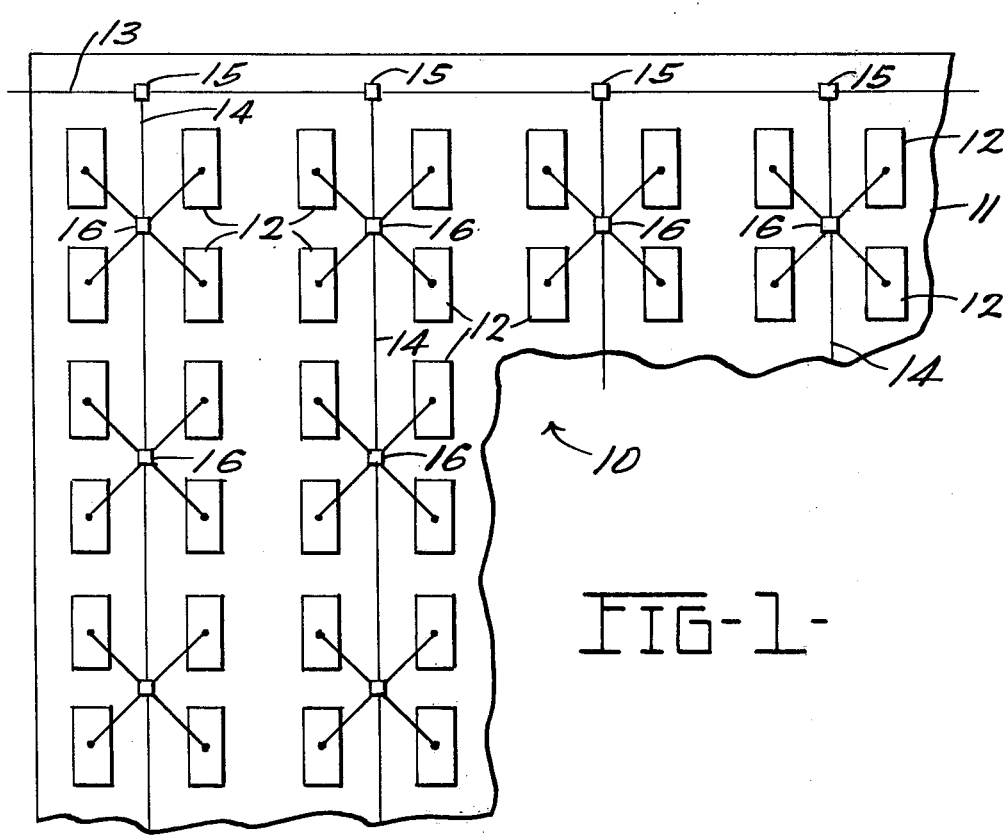
FIG-1-
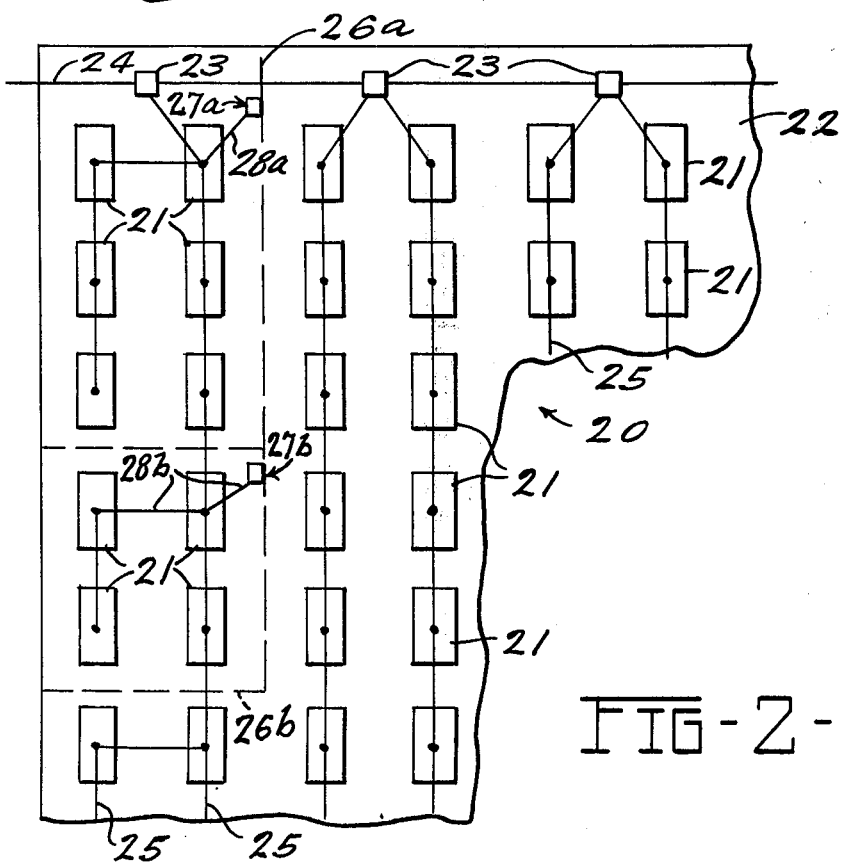
FIG-2-

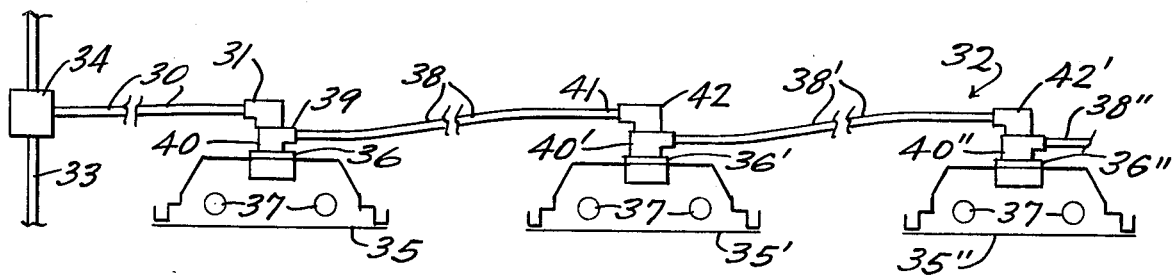
FIG-3-
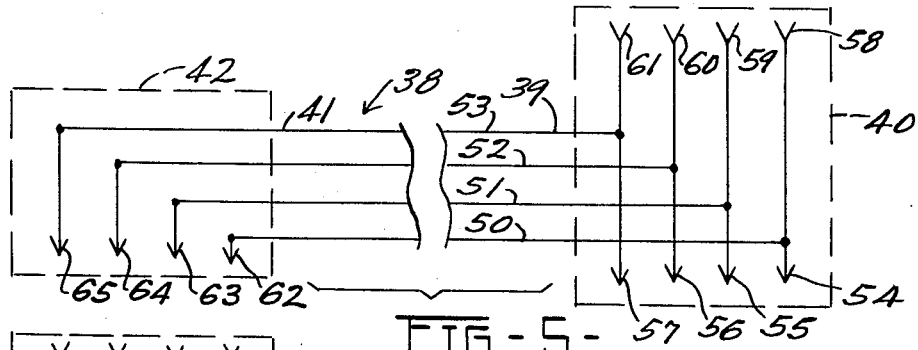
FIG-5-
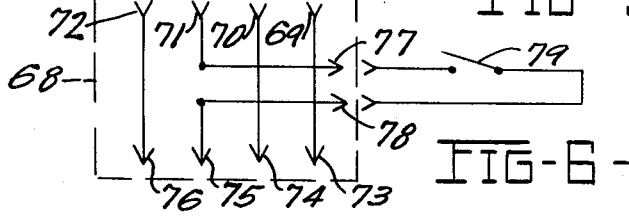
FIG-6-
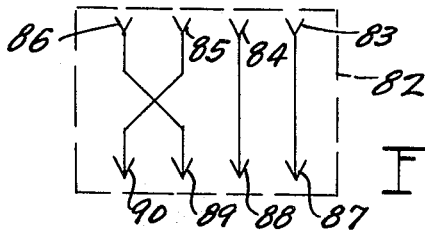
FIG-7-
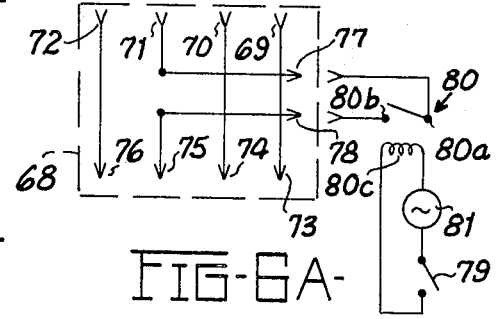
FIG-6A-
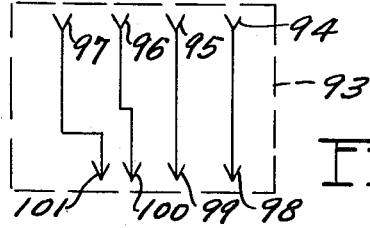
FIG-8-
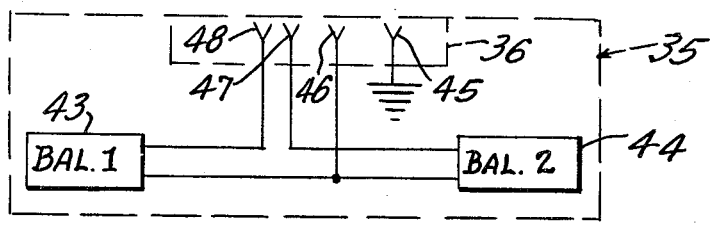
FIG-4-

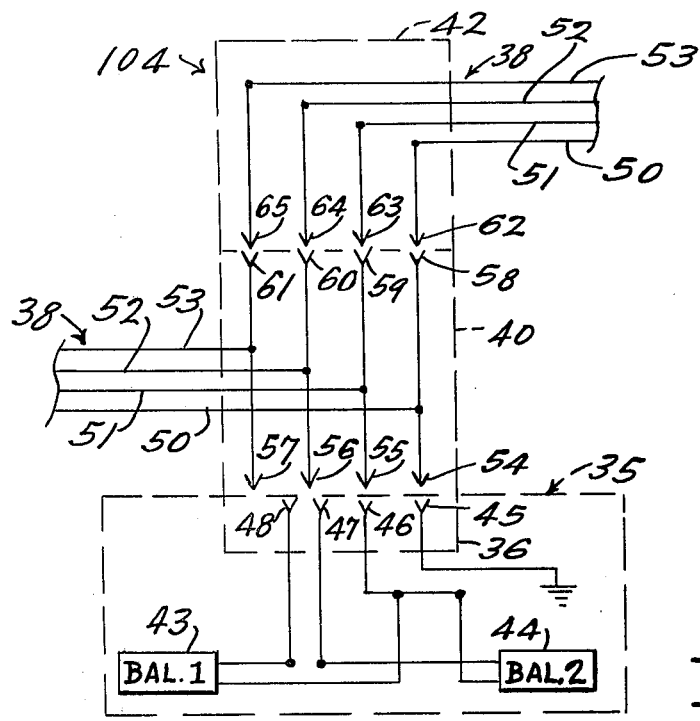
FIG-9-
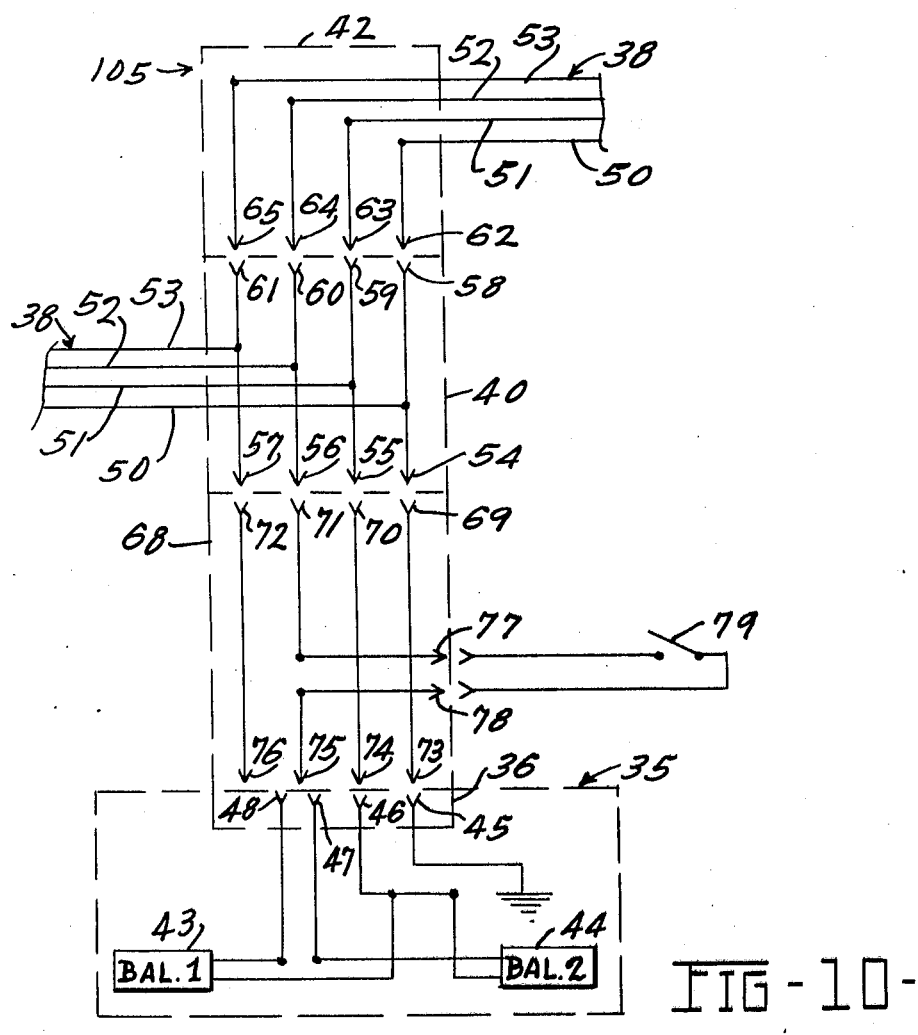
FIG-10-

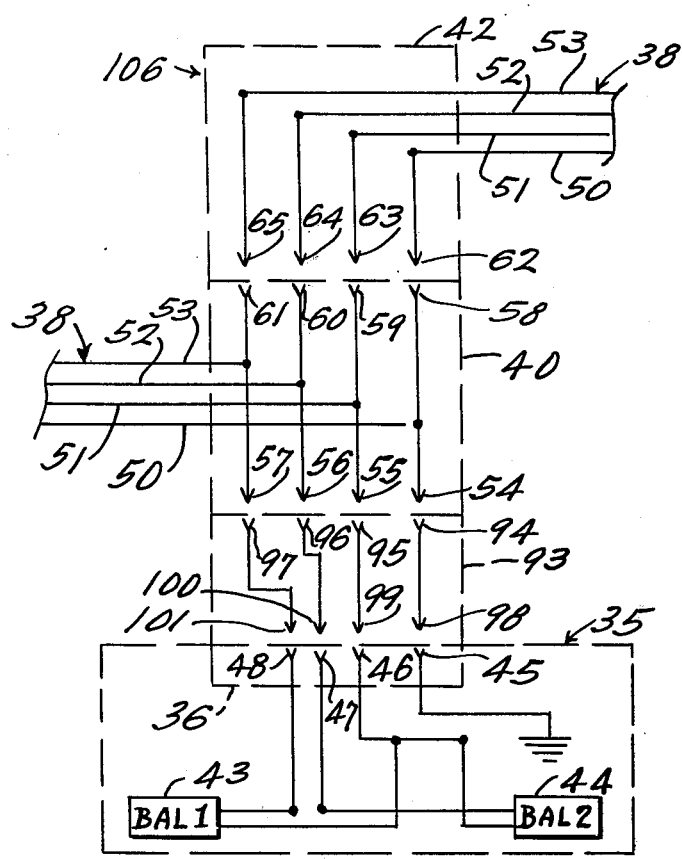
FIG-11-
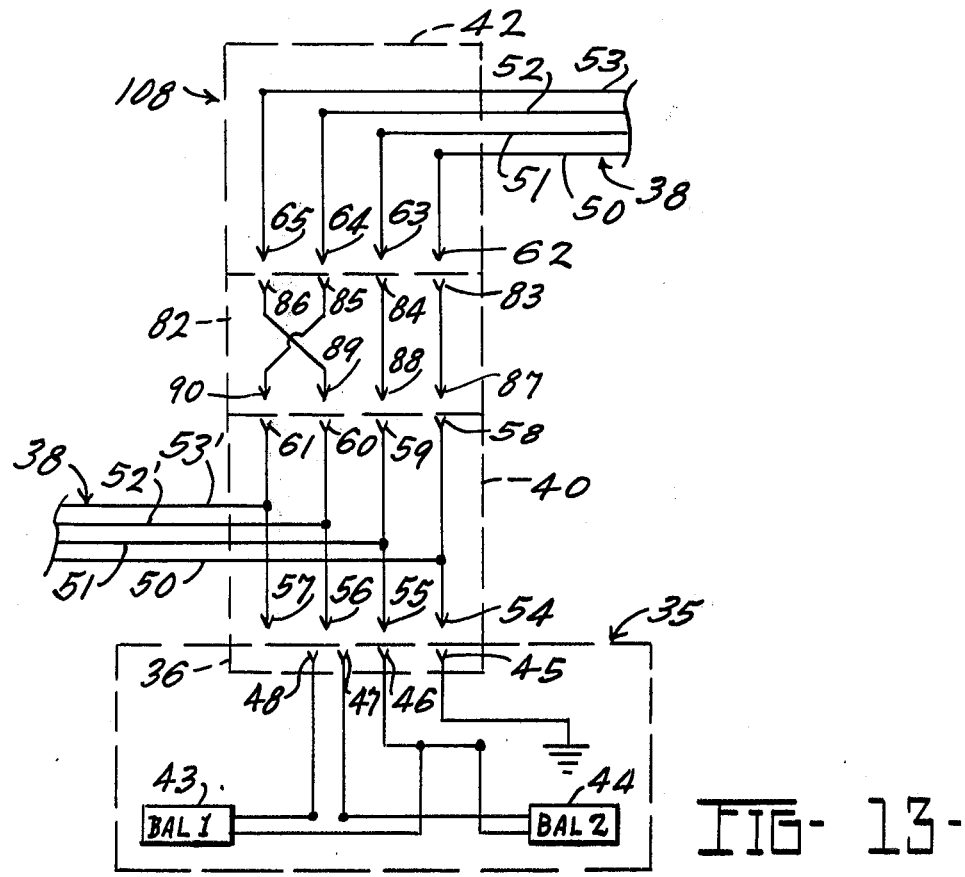
FIG-13-

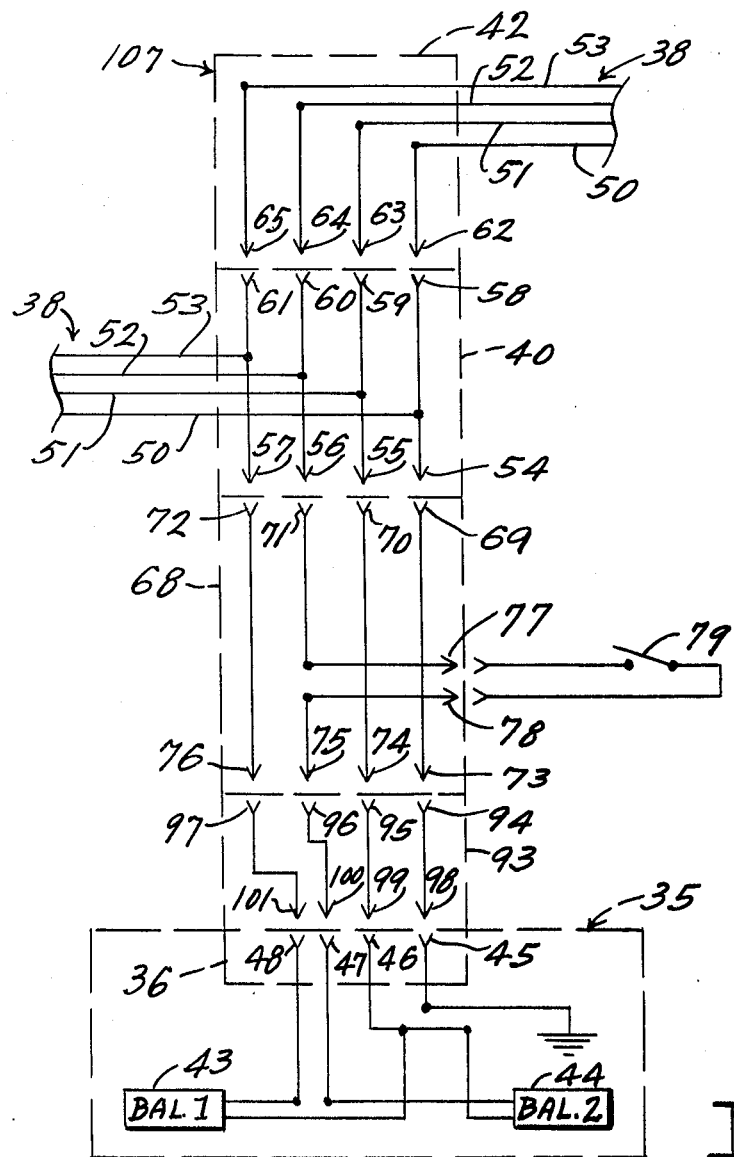
FIG-12-
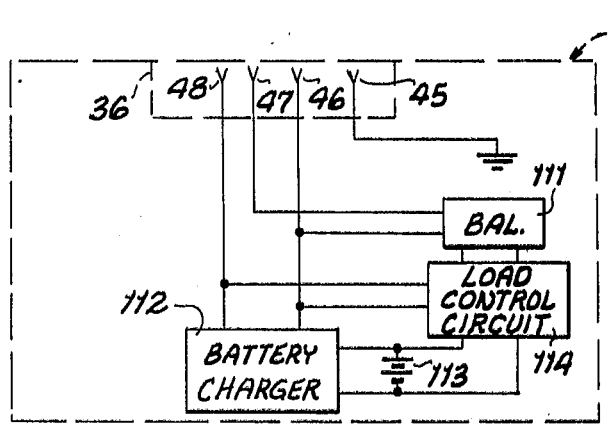
FIG-12A-

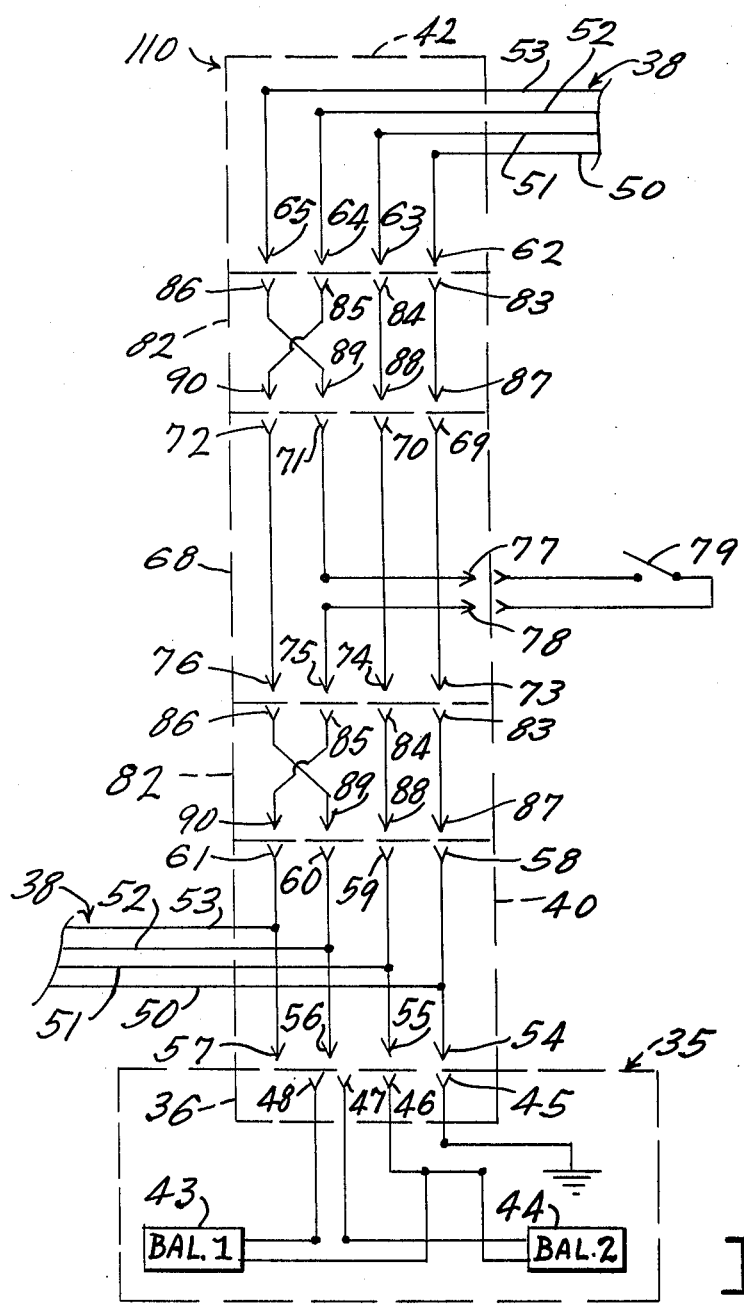
FIG-15-

LIGHTING SYSTEM

BACKGROUND OF THE INVENTION

This invention relates to lighting systems and more particularly to an improved lighting system in which power distribution to lighting fixtures is easily modified to meet changing requirements.

Fluorescent lighting fixtures are generally used for illuminating floor areas in commercial buildings due to their efficiency as compared to other light sources, although other types of light sources such as incandescent lamps or high intensity discharge (HID) lamps or a combination of different types of light sources may be used. In modern construction of commercial buildings such as store and office buildings, ceiling structures generally comprise suspended ceilings. The space above the suspended ceiling is used for distribution of conditioned air and electrical power to the area below the ceiling. Where the area consists of a large open area such as in a large retail store, lighting fixtures may be suspended from a grid structure which supports the suspended ceiling. However, lighting fixtures of this type are not economical or pleasing in appearance where the floor space is to be divided into a number of offices and where the ceiling is relatively low. In such cases, lighting fixtures are typically recessed into the suspended ceiling such that a light diffusing grid on each fixture is positioned substantially coplanar with the ceiling. In many cases, the suspended ceiling is installed prior to partitioning a floor area into individual office spaces. The use of recessed fluorescent lighting fixtures for lighting the floor area facilitates partitioning the floor area into office spaces either without moving or with a minimum of moving the lighting fixtures which are recessed into the ceiling. After the floor area is partitioned into the individual offices, the lighting fixtures often must be rewired to permit switching the fixtures in each office independent of the fixtures in the remaining offices. Rewiring of the fixtures adds considerably to the expense of installing the lighting system. This expense is normally borne by the lighting contractor who must bid competitively for a contract to install and modify the lighting system. However, the contractor must place his bid without knowing his actual modification expenses since at the time the bid is placed, the contractor may have no information on the final floor plan for the building for which he is placing the bid.

U.S. Pat. No. 3,719,768 which issued on Mar. 6, 1973 to Nils G. Jonsson discloses one system which facilitates wiring of a lighting system when room partitions are installed. In the system disclosed in the Jonsson patent, flexible electrical cords are used for connecting electrical switches and outlets mounted in wall panels with power distribution boxes and control relays located above a suspended ceiling. The power distribution boxes and relays are also connected to lighting fixtures. The Jonsson system has the advantage of providing prewired wall panels which may be readily installed for partitioning a floor area into office spaces. However, the physical wiring above the suspended ceiling must be modified when the wall panels are installed to interconnect all lighting fixtures over a partitioned office with the wall switch. Considerable labor is still required for modifying the wiring when the wall partitions are installed. Another prior art system is shown in U.S. Pat. No. 3,683,101 which issued on Aug. 8, 1972 to Milton Liberman. In the Liberman system, prewired lighting fixtures are plugged into prewired receptacles on channels which are integral with some of the inverted tee support members for a suspended ceiling. Installation of a system of this type requires less labor over systems which are entirely wired on the site. However, connections to the wiring in the channels must be changed when switching requirements change, as when a space below the suspended ceiling is partitioned. Furthermore, the prewired channels do not readily adapt to the switching power to some fixtures plugged into a channel while leaving unswitched other similar fixtures plugged into the same channel, unless separate wires are run to each channel receptacle.

SUMMARY OF THE INVENTION

According to the present invention, an improved system for lighting a floor area in a building is designed such that the control of various lighting fixtures may be readily modified without changing the power distribution wires running between lighting fixtures. The lighting fixtures mounted in a suspended ceiling for lighting the floor area are arranged into one or more branch circuits. A branch circuit is defined by a plural conductor electrical circuit formed from branch circuit cables connected from fixture-to-fixture. An electrical connector mounted on each lighting fixture is wired to one or more ballast circuits for energizing fluorescent lamps in the fixtures or to lighting circuits for energizing other types of lamps. A connector on one end of each branch circuit cable includes a portion for engaging the fixture connector and a portion for engaging a connector on the other end of the branch circuit cable leading to the next fixture. Thus, the cables which form a branch circuit supply power to all fixtures in the branch circuit.

The system may be initially installed in a building such that power to all fixtures in a branch circuit is controlled by a single master switch. After the floor space is rented and partitions are installed, the system may be modified to permit selective switching of the fixtures in a branch circuit. The system is modified by the insertion of one or more adapters between either the fixture and a connected branch circuit cable or between two series connected branch circuit cables, or at both locations. The adapters include a circuit divider adapter which may be positioned between the lighting fixture connector and a connected branch circuit cable which separates circuit connections to two different ballast circuits or to a ballast circuit and another circuit within the fixture to permit, for example, switching one circuit while leaving the other circuit unaffected. Such an arrangement permits, for example, leaving perhaps one lamp circuit in every five fixtures unswitched for night lighting while the remaining lamp circuits are connected to a switched circuit. A second adapter consists of a switch adapter which may be positioned between either a fixture connector and a connected branch circuit cable or between two connected branch circuit cables. The switch adapter is then connected to an external switch such as a wall switch for switching power either to one lighting fixture or to a number of lighting fixtures in a branch circuit. A circuit converter adapter may also be positioned between either a fixture connector and a connected branch circuit cable or between two series connected branch circuit cables. The converter adapter interchanges two circuits in the branch circuit to either change the electrical circuit connection from a branch circuit connector to a lighting fixture connector or to change the circuit connection to all downstream fixtures in the branch circuit.

Through the use of factory assembled branch circuit cables, the various adapters and factory wired lighting fixtures, field wiring while installing or modifying a lighting system is limited to connecting external switches to the switch adapters and connecting a main power distribution buss to each branch circuit. All other circuit changes are made by merely plugging together various components. There will be more uniformity in the system and less chance of wiring error over prior art systems, even when the system is installed with relatively low skilled labor. A high degree of skill is not required for installing an electrically safe system. In addition, highly skilled labor is not required for modifying or servicing the system since modification merely requires the selective insertion of circuit adapters into the branch circuit without the need for rewiring or for replacing a fixture which needs maintenance since a replacement fixture may be plugged into the branch circuit. Modification of the system requiring relocation of a fixture is also easily accomplished since existing branch circuit cables may be replaced with either longer or shorter cables without rewiring or splicing cables. The flexibility of the system is outside of the lighting fixtures, which are factory wired and may be uniform for an entire system.

Accordingly, it is a preferred object of the invention to provide an improved system for lighting a floor area in a building.

Another object of the invention is to provide a system for lighting a floor area in a building which is easily modified to meet changing requirements.

Still another object of the invention is to provide a system for lighting the floor area in a building having a minimized installation cost.

Other objects and advantages of the invention will become apparent from the following detailed description, with reference being made to the accompanying drawings.

BRIEF DESCRIPION OF THE DRAWINGS

FIG. 1 is a fragmentary plan view showing a portion of a prior art system for lighting a floor area in a building;

FIG. 2 is a fragmentary plan view showing a portion of a branch circuit system incorporating the present invention for lighting a floor area in a building;

FIG. 3 is an elevational view, in fragmentary, showing the branch circuit cable connections between several lighting fixtures in a branch circuit;

FIG. 4 is a schematic circuit diagram for a fluorescent lighting fixture showing two ballast circuits connected to a fixture connector;

FIG. 5 is a circuit diagram for a branch circuit cable and the attached connectors;

FIG. 6 is a circuit diagram for a switch adapter;

FIG. 6A is a circuit diagram for a modified switch adapter;

FIG. 7 shows a circuit diagram for a circuit converter adapter;

FIG. 8 shows a circuit diagram for a circuit divider adapter;

FIG. 9 is a schematic diagram showing one embodiment of a branch circuit connection at a lighting fixture;

FIG. 10 is a schematic diagram showing another embodiment of a branch circuit connection at a lighting fixture;

FIG. 11 is a schematic diagram showing another embodiment of a branch circuit connection at a lighting fixture;

FIG. 12 is a schematic diagram showing another embodiment of a branch circuit connection at a lighting fixture;

FIG. 12A is a schematic diagram showing an emergency lighting fixture suitable for use with the branch circuit connection of FIG. 12;

FIG. 13 is a schematic diagram showing another embodiment of a branch circuit connection at a lighting fixture;

FIG. 15 is a schematic diagram showing still another embodiment of a branch circuit connection at a lighting fixture.

DESCRIPTION OF THE PREFERRED EMBODIMENTS

Figure 14:
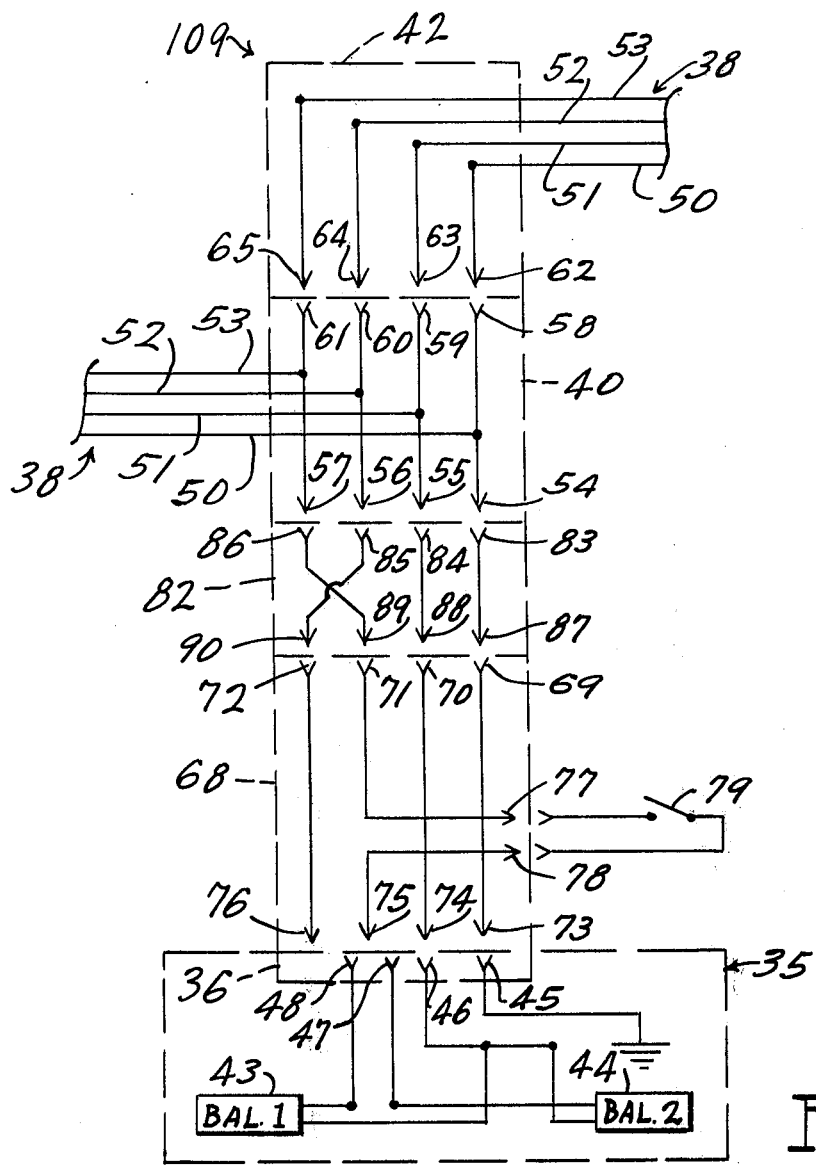
FIG. 14 is a schematic diagram showing another embodiment of a branch circuit connection at a lighting fixture.

Referring now to the drawings and particularly to FIG. 1, a plan view is shown of a portion of a prior art lighting system 10 for lighting a floor area 11 in a building. Fluorescent lighting fixtures 12 are arranged in a regular pattern in a ceiling structure for illuminating the floor area 11. The ceiling structure is of a conventional design such as a suspended or dropped ceiling formed from a grid of inverted tees. The lighting fixtures 12 are positioned in a portion of the openings in the grid structure while the remaining openings are closed with ceiling panels. Power is supplied to the system 10 from a main power buss 13. A plurality of power distribution circuits 14 extend from junction boxes 15 spaced along the main power buss 13. Junction boxes 16 are also spaced along each distribution circuit 14. Several of the fixtures 12 are connected to each junction box 16.

The prior art system shown in FIG. 1 has commonly been installed in office buildings during initial construction. After initial construction is completed, the building may be leased as individual office spaces. Walls or partitions are then installed to form the leased office spaces. After the partitions are installed, the electrical contractor must return and physically rewire the lighting system for supplying the needs of the individual offices. For example, it may be necessary to install a wall switch for controlling the lights in each office. In some cases, it is also desirable to have a small portion of the lights in each office controlled independently of the remaining lights for night maintenance purposes. A single switch may be provided for controlling all night lights for the floor area 11. Since the lighting fixtures may be initially installed without knowledge of the final location of room partitions, at least some of the fixtures will need to be moved to obtain proper light distribution in the partitioned areas and to eliminate locating fixtures directly above the partitions. Rewiring and modifying the system to meet these changing requirements has generally been quite expensive and time consuming, particularly where fixtures must be relocated. Furthermore, it is often impossible to accurately estimate this expense in advance since the final floor plan and lighting requirements may not be known.

Turning now to FIG. 2, a lighting system 20 is shown incorporating the principles of the present invention. As in the prior art, a plurality of fluorescent lighting fixtures 21 are mounted in a ceiling structure for illuminating a floor area 22 in a building. Junction boxes 23 are located in a main power distribution buss 24 for supplying power to a plurality of branch circuits 25. Each of the branch circuits 25 is connected to a plurality of the fixtures 21. The branch circuits 25 may initially be arranged such that all the fixtures 21 are simultaneously illuminated when power is applied to the buss 24. Modifications are subsequently made by the selective insertion of adapters into the branch circuits 25 and between the branch circuits 25 and the fixtures 21. After the fixtures 21 are initially installed and the branch circuits 25 are connected, the floor area 22 may be divided into office spaces, such as the spaces 26a and 26b depicted by dashed lines. Wall switches 27a and 27b may be positioned adjacent entryways for the respective spaces 26a and 26b for controlling the lighting fixtures 21 over such office spaces. The branch circuits 25 that extend through the office spaces 26a and 26b are connected by wires or cables 28a and 28b to control power to lighting fixtures 21 located over the areas 26a and 26b respectively. As will be discussed in greater detail below, the wires 28a and 28b are connected to the branch circuits 25 by means of switch adapters which are merely inserted into the circuit. It is not necessary to completely rewire the power distribution connections to the individual fixtures located in each area or office space as in the prior art.

Turning now to FIG. 3, an elevational view is shown for a portion of a branch circuit 32. A main power distribution buss 33 supplies power through a junction box 34, a cable 30 and a connector 31 to the branch circuit 32. The branch circuit 32 distributes power from the buss 33 to a plurality of fluorescent lighting fixtures 35. A first connector 36 mounted on each fixture 35 is factory wired to electrical circuits within the fixture 35. The fixtures 35 typically have one or more ballast circuits for operating a plurality of fluorescent lamps 37 and may also include other electrical circuits, such as a battery charging circuit in a lighting fixture adapted to provide emergency lighting during power failures. It will be appreciated, of course, that the fixtures 35 may be for other types of lamps such as incandescent or high intensity discharge lamps and that the fixtures may be of types other than recessed such as surface mounted fixtures.

A branch circuit cable 38 is connected between each adjacent pair of fixtures 35 in the branch circuit 32. Each cable 38 has an end 39 terminating at a second connector 40 which is adapted to engage the connector 36 on the fixture 35. A second end 41 of the cable 38 is terminated at a third connector 42 which is adapted to engage the second connector 40' on the next cable 38' in the branch circuit 32. The connectors 40 and 42 mate to form continuous or series electrical connections between a plurality of conductors in the cables 38 and 38'. At the same time, the second connector 40' also makes electrical connection to the first connector 36' on a lighting fixture 35. The cable 30 and connector 31 apply power from the buss 33 to the branch circuit 32. The connector 31 is preferably identical to the connectors 42 so that the connector 31 can be attached to the connector 40 on the first cable 38 in the branch circuit 32. As will be discussed in greater detail below, electrical connections in the branch circuit 32 may be modified through the insertion of adapters between the first connector 36 on the fixture 35 and the second connector 40 on a branch circuit cable 38 or between a third connector 42 on one branch circuit cable 38 and a connected second connector 40 on the next branch circuit cable 38.

Turning now to FIG. 4, a typical electrical circuit is shown for one of the lighting fixtures 35. The fixture 35 shown in FIG. 4 is provided with two ballast circuits 43 and 44 wired to the connector 36 which, as shown in FIG. 3, is mounted on the upper surface of the fixture 35. The connector 36 is provided with four terminals 45–48 which are positioned to engage terminals in the connector 40 for electrically connecting the fixture 35 into the branch circuit 32. The terminal 45 is shown for use as an electrical ground circuit and is connected to the housing for the fixture 35. Of course, other grounding methods may also be used in place of the terminal 45. For example, the ground connection can be through a metal housing for the fixture 35 and flexible metal conduit on the branch circuit cables 38. The terminal 46 provides a common electrical connection to the two ballast circuits 43 and 44. The terminal 47 is connected as a hot terminal to complete the circuit to the ballast circuit 44 and the terminal 48 is connected as a hot terminal to complete the circuit to the ballast circuit 43. Thus, fluorescent lamps connected to the ballast circuit 44 are illuminated when power is applied between the terminals 46 and 47 and fluorescent lamps connected to the ballast circuit 43 are illuminated when power is applied between the terminals 46 and 48. Other circuit arrangements may also be used within the fixture 35. The fixture 35 may, for example, be designed to provide emergency lighting in the event of a power failure. Such fixtures normally include a battery which operates as a standby power source, an automatic battery charger and an automatic load control circuit for switching between the main and standby power sources. In a fixture of this type, one or more ballast circuits may be connected in parallel between two of the terminals, 46 and 47 for example, and the battery charger and load control circuit are connected between a different pair of terminals, such as 46 and 48. Power to the terminal 47 may then be switched for turning the lights on and off while the terminal 48 is energized at all times, except during a power failure. Of course, other circuit arrangements may also be incorporated into the lighting fixture 35, as the need arises.

Turning now to FIG. 5, circuit details are shown for one of the branch circuit cables 38. As previously indicated, a connector 40 is attached to one end 39 of the cable 38 and a connector 42 is attached to the other end 41 of the cable 38. The spacing between the connectors 40 and 42 on the cables 38 should be of standard lengths such as 4 feet, six feet, eight feet, etc., to conform with standard suspended ceiling sizes. The cable 38 is shown as carrying four conductors 50–53 which extend between the connectors 40 and 42. The connector 40 includes four terminals 54–57 which are arranged to be received by the connector 36 on a lighting fixture 35. The conductors 50–53 are electrically connected, respectively, to the terminals 54–57. The connector 40 also includes four terminals 58–61 which also are connected respectively to the conductors 50–53. The terminals 58–61 are adapted to engage corresponding terminals 62–65 on a connector 42 at the end 41 of the next cable 38 in the branch circuit 32. The connector 42 shown on the end 41 of the cable 38 in FIG. 5 has the terminals 62–65 connected, respectively, to the conductors 50–53. Thus, the conductor 50 for example interconnects the terminal 62 on the connector 42 with the terminals 54 and 58 on the connector 40. The terminals 62–65 on the connector 42 are arranged identically to the terminals 54–57 on the connector 40 such that for the last cable 38 in the branch circuit 32 the connector 42 engages the connector 36 on the last lighting fixture 35.

As previously indicated, the connector 40 on the branch circuit cable 38 is adapted to connect with the connector 36 on the lighting fixture 35. When the connectors 36 and 40 are connected together, the terminal 54 on the connector 40 engages the terminal 45 on the connector 36 for grounding the lighting fixture 35. The common electrical terminal 46 on the fixture connector 36, which serves both ballast circuits in the fixture 35 shown in FIG. 4, engages the terminal 55 on the connector 40. The terminal 56 on the connector 40 is positioned such that it simultaneously engages both terminals 47 and 48 on the fixture connector 36 to supply power in parallel to the ballast circuits 43 and 44. Normally, no connection is made from the terminal 57 to the fixture connector 36. A connection is made to the terminal 57 only when a circuit divider adapter is inserted between the connectors 36 and 40, as will be discussed below.

Referring now to FIG. 6, the circuit for a switch adapter 68 is shown. The switch adapter 68 includes a set of four input terminals 69–72 which are adapted to contact either the terminals 54–57, respectively, on a connector 40 or the terminals 62–65, respectively, on a connector 42. The switch adapter 68 also includes a set of four output terminals 73–76 which are adapted to contact either the terminals 58–61, respectively, on a connector 40 or terminals on a fixture connector 36. The terminals 73 and 74 contact the terminals 45 and 46, respectively, on the connector 36 while the terminal 75 simultaneously contacts both of the terminals 47 and 48. As with the terminal 57 on the connector 40 of the terminal 65 on the connector 42, the terminal 76 on the switch adapter 68 is located such that it does not normally engage a terminal on the fixture connector 36. The terminals 69 and 73, the terminals 70 and 74 and the terminals 72 and 76 on the switch adapter 68 are electrically connected together to maintain circuit continuity when the adapter 68 is inserted into a circuit. The terminal 71 on the switch adapter 68 is connected to a switch terminal 77 and the terminal 75 is connected to a second switch terminal 78. An external switch 79, such as a wall switch, is wired to the terminals 77 and 78 for making and breaking the electrical circuit connection between the input terminal 71 and the output terminal 75 on the switch adapter 68. As shown in FIG. 6A, the switch 79 may also comprise a relay 80 having switched terminals 80a and 80b connected respectively to the terminals 77 and 78 of the switch adapter 68. The relay has a low voltage winding 80c connected in series with a low voltage source 81 and the switch 79 to permit low voltage control of the circuit connection between the input and output terminals 71 and 75 on the switch adapter 68.

Since the input terminals 69–72 on the switch adapter 68 will engage either the terminals 54–57 on the connector 40 or the terminals 62–65 on the connector 42 and the output terminals 73–76 on the switch adapter 68 will engage either the terminals 58–61 on the connector 40 or the terminals on the fixture connector 36, the switch adapter 68 may be positioned either between the fixture connector 36 and a connected one of the connectors 40, or 42 at the end of the branch circuit cable, or between two connected connectors 40 and 42 on adjacent branch circuit cables 38. When the adapter 68 is located between the fixture connector 36 and one of the connectors 40 or 42, the external switch 79 controls the application of power to both ballast circuits 43 and 44 in a fixture 35 having a circuit arrangement such as that shown in FIG. 4. When, on the other hand, the switch adapter 68 is located between two connectors 40 and 42 in a branch circuit 32, the external switch 79 controls power to the conductor 52 and circuitry connected to the conductor 52 downstream from the switch adapter 68.

Referring now to FIG. 7, circuitry is shown for a circuit converter adapter 82. The circuit converter adapter 82 includes a set of four input terminals 83–86 which are arranged, respectively, in an identical configuration to the terminals 58–61 on the cable connector 40. The circuit converter adapter 82 also includes a set of four output terminals 87–90 which are arranged, respectively, in an identical configuration to the terminals 54–57 on the cable connector 40 or the terminals 62–65 on the cable connector 42. The pair of input and output terminals 83 and 87 and the pair of input and output terminals 84 and 88 are electrically connected together such that circuit continuity is maintained in the connected circuits when the adapter 82 is located between two connectors. The input terminal 85 and the output terminal 90 and the input terminal 86 and the output terminal 89 are also electrically interconnected such that the circuits connected to the input terminals 85 and 86 are interchanged when the adapter 82 is inserted between two connectors. If the circuit converter adapter 82 is inserted, for example, between a branch circuit cable connector 40 and a lighting fixture connector 36, the adapter 82 will cause the conductor 53 to be electrically connected to the terminals 47 and 48 on the fixture connector 36 in place of the conductor 52. The converter adapter 82 may also be inserted between connectors 40 and 42 on two connected branch circuit cables 38. When the converter adapter 82 is placed in this location, it causes the conductors 52 and 53 to be electrically interchanged for all portions of the branch circuit 32 electrically downstream from the circuit converter adapter 82 or until another circuit converter adapter is used.

Turning to FIG. 8, circuit details are shown for a circuit divider adapter 93. The circuit divider adapter 93 includes four input terminals 94–97 which are arranged in a configuration identical to that of the terminals 58–61 on the connector 40. The circuit divider adapter 93 also includes four output terminals 98–101 which are arranged to engage the four terminals 45–48, respectively, on the fixture connector 36. Electrical circuit connections between the respective input terminals 94–97 and output terminals 98–101 on the circuit divider adapter 93 maintain circuit continuity. When the circuit divider adapter 93 is positioned between a fixture connector 36 and a connected branch circuit connector 40 or 42, the circuit divider adapter 93 electrically connects the four conductors 50–53 with the four terminals 45–48 on the fixture connector 36. As a consequence of the location of the terminals 100 and 101 on the circuit divider 93, the two ballast circuits 43 and 44 in the lighting fixture 35 are connected to separate circuits in the branch circuit 32. This circuit arrangement permits switching one of the ballast circuits 43 or 44 without affecting the other. Or, where the lighting fixture 35 is of an emergency type including standby power provisions, the ballast circuits 43 and 44 may be connected together to the terminal 47 for switching independent of an automatic battery charger and automatic load control circuit connected to the terminal 48.

The remaining drawings show various circuit arrangements which may be formed by combining the components shown in FIGS. 4–8. FIG. 9 shows the circuit connections for a regular branch circuit 104 composed of a first connector 36 on a lighting fixture 35, a second connector 40 on one of the branch circuit cables 38 and a third connector 42 on another of the branch circuit cables 38. The second connector 40 is attached to the first connector 36 and to the third connector 42. With this arrangement, the connectors 40 and 42 maintain series circuit continuity between the four conductors 50–53 in the two connected branch circuit cables 38. In addition, the connector 40 electrically connects the conductor 50 to the terminal 45, the conductor 51 to the terminal 46 and the conductor 52 to the terminals 47 and 48 in the fixture connector 36 for supplying electrical power in parallel to the two ballast circuits 43 and 44 in the lighting fixture 35. Fluorescent lamps wired to the ballast circuits 43 and 44 will be illuminated whenever power is applied on the conductor 52. When a system of the type shown in FIG. 2 is initially installed in a building, electrical connections to the various lighting fixtures will generally be in the form of the regular branch circuit 104 shown in FIG. 9. The system subsequently may be modified by the insertion of adapters into the regular branch circuit 104.

Turning now to FIG. 10, a circuit 105 is shown in which power to a single lighting fixture 35 is switched by means of an external switch 79, such as a wall switch located near the entrance to a room or office. Power to the lighting fixture 35 may be switched merely by the insertion of a switch adapter 68 between the first or fixture connector 36 and the second connector 40 on the next or downstream cable 38 in the branch circuit and connecting the switch adapter 68 to the switch 79. The second connector 40 is also connected to a third connector 42 on the preceding or upstream cable 38 in the branch circuit. The connected connectors 40 and 42 maintain series circuit continuity in the branch circuit connectors 50–53. The switch adapter 68 connects the conductors 50 and 51 to the terminals 45 and 46, respectively, in the fixture connector 36 for grounding the fixture 35 and for making a common electrical connection to the two ballast circuits 43 and 44. The external wall switch 79 connected to the switch adapter 68 selectively makes and breaks the circuit connection between the hot conductor 52 and the terminals 47 and 48 which supply power to the ballast circuits 43 and 44. Thus, when the switch 79 is closed, lights connected in the ballast circuits 43 and 44 will be illuminated and when the switch 79 is open, such lights will be off. In place of a wall switch, the switch 79 may comprise the switched terminals on a relay. The control winding (not shown) on the relay may then be connected to a low voltage power source and a wall switch for low voltage control of the lighting fixture 35.

Turning to FIG. 11, a circuit 106 is shown in which a circuit divider adapter 93 has been inserted between the connected first connector 37 on a fixture 35 and second connector 40 on a branch circuit cable 38. The connector 40 on the branch circuit cable 38 is also connected to a third connector 42 on an upstream branch circuit cable 38. The connectors 40 and 42 on the two branch circuit cables 38 maintain series circuit continuity for the branch circuit conductors 50–53. The circuit divider adapter 93 electrically connects the four conductors 50–53, respectively, to the four terminals 45–48 on the fixture connector 36. As a consequence of the use of the circuit divider 93, the ballast circuit 43 is energized from the conductor 53 while the ballast circuit 44 is energized from the conductor 52. This arrangement may permit the distribution of power load requirements between two separate circuits or it may permit the control of lights connected to the ballast circuit 43 independent of lights connected to the ballast circuit 44. Or, in some cases, one of the ballast circuits 43 or 44 may be replaced with other circuit components which may be controlled separately of the remaining ballast circuit.

The circuit of FIG. 11 also may be readily modified to provide a reduced light level, and therefore a reduced power consumption by the fixture 35. One of the terminals 100 or 101 may be removed from the circuit divider adapter 93 to disable either the ballast circuit 44 or the ballast circuit 43. Power consumption will then be reduced by both the load requirements of the extinguished lamps and the load requirements of the ballast circuit which operates the lamps. During energy shortages, one energy conserving practice has been to remove a portion of the lamps from each fixture. However, in fluorescent lighting fixtures the ballast circuit will continue to consume power even though lamps are removed. Through the use of a modified circuit divider adapter 93, load consumption by the ballast circuit may be totally eliminated when some of the lamps in a fixture must be disconnected. Also, the lamps may be disconnected without physically removing the lamps from the fixture.

FIG. 12 shows a circuit 107 in which both a circuit divider adapter 93 and a switch adapter 68 are located between a connected first connector 36 on a lighting fixture 35 and a second connector 40 on a branch circuit cable 38. The second connector 40 is also connected to a third connector 42 on an upsteam branch circuit cable 38. Since the connectors 40 and 42 are connected together, circuit continuity is maintained in each of the branch circuit conductors 50–53. The series connected switch adapter 68 and circuit divider adapter 93 also maintain circuit continuity between the respective conductors 50, 51 and 53 in the branch circuit and the terminals 45, 46 and 48 on the fixture connector 36. The conductor 52 in the branch circuit is connected through the switch adapter 68, the external switch 79 and the circuit divider adapter 93 to the terminal 47 on the fixture connector 36. Thus, power to the ballast circuit 44 is controlled by means of the switch 79 while power on the conductor 53 is applied directly to the ballast circuit 43. Switching half of the lamps in a fixture independent of the other half of the lamps can have several benefits. Such an arrangement can be used to produce two illumination levels. A brighter of the two levels may be used, for example, for daytime lighting while the reduced level is used at nighttime when lighting is needed only for maintenance and security purposes. Or, half of the lamps in the fixture 35 can be turned off during days when natural light is high, thereby conserving energy.

The circuit 107 is also ideal for use with emergency lighting fixtures which include an automatic battery charger for charging a battery used as a standby power source and an automatic load control circuit for switching between the main and standby power sources such as the fixture 35' shown in FIG. 12A. The terminal 47 on the fixture connector 36 which is connected through the switch 79 to the power source supplies power to one or more ballast or lighting circuits 111 connected in parallel while the terminal 48, which may be maintained hot at all times, is connected to supply power to a battery charger 112 and a load control circuit. The battery charger 112 is of any conventional design for charging a battery 113. In the event of a power failure at the terminal 48, the load control circuit 114 energizes the ballast circuit from the battery 113 in a conventional manner. Emergency lighting fixtures including a battery charger, a battery, and a load control circuit for operating a light during a power failure are well known in the prior art and are available commercially. It will also be apparent that the circuit 107 may be readily modified by inserting the switch adapter 68 between the connected second and third connectors 40 and 42. The connector 40 is then connected through the circuit divider 93 to the lighting fixture 35. In this embodiment, it will be apparent that power will be controlled by the external switch 79 to not only the fixture 35 shown in FIG. 12, but also to all downstream fixtures connected to receive power from the conductor 52 from the connector 40.

FIG. 13 shows a circuit 108 in which a first or fixture connector 36 is connected to a second connector 40 on a branch circuit cable 38. A circuit converter adapter 82 has been inserted between the connected second connector 40 and third connector 42 for interchanging electrical connections in the conductors 52 and 53. Power is supplied from the four conductors 50–53 in a branch circuit cable 38 to the third connector 42. By locating the circuit converter adapter 82 between the connectors 40 and 42, power arriving to the connector 42 on the conductor 53 leaves the connector 40 on a conductor 52' and power arriving to the connector 42 on a conductor 52 leaves the connector 40 on a conductor 53'. Series circuit continuity is maintained on the conductors 50 and 51. Due to the interchanging of the conductors 52 and 53 in the circuit converter adapter 82, the ballast circuits 43 and 44 in the lighting fixture 35 receive power over the upstream conductor 53 rather than the conductor 52. Similarly, all downstream lighting fixtures will also receive power over the upstream conductor 53 which is now connected to the downstream conductor 52', unless an additional circuit converter adapter 82 is located at some downstream point in the branch circuit. One possible use for the circuit converter adapter 82 is to divide power loads to lighting fixtures in a branch circuit between the two conductors 52 and 53. For example, if a branch circuit contains twenty lighting fixtures, the circuit 108 of FIG. 13 may be used for connecting the eleventh lighting fixture in the branch circuit. As a consequence, the first ten fixtures in the branch circuit will receive power over the conductor 52 while the remaining eleventh through twentieth lighting fixtures in the branch circuit will receive power over the conductor 53. Another possible modification to the circuit of FIG. 13 would be to locate the circuit converter adapter 82 between the connectors 36 and 40 instead of between the connectors 40 and 42. This arrangement would result in only a single lighting fixture receiving power over the conductor 53 rather than all downstream fixtures. Such a circuit could be used, for example, for every third or every fifth lighting fixture. These fixtures could then be switched or unswitched independent of the remaining majority of the fixtures to provide night lighting for security or maintenance purposes.

FIG. 14 shows a circuit 109 in which a switch adapter 68 and a circuit converter adapter 82 are located between a first connector 36 on a lighting fixture 35 and a second connector 40 on one end of a branch circuit cable 38. The second connector 40 is also connected through a third connector 42 on a second branch circuit cable 38. The circuit converter adapter 82 and the switch adapter 68 maintain circuit continuity respectively between the conductors 50 and 51 and the terminals 45 and 46 on the fixture connector 36. In place of the conductor 52, the circuit converter adapter 82 connects the conductor 53 through the switch adapter 68 and the external switch 79 to the terminals 47 and 48 in the fixture connector 36. Therefore, in the circuit 109, a single lighting fixture 35 receives switched power from the branch circuit conductor 53, while no connection is made to the branch circuit conductor 52.

Finally, turning to FIG. 15, a circuit 110 is shown in which a fixture connector 36 is connected to a connector 40 on a downstream branch circuit cable 38 and in which a circuit converter adapter 82, a switch adapter 68 and a second circuit converter adapter 82 have been inserted in series between the connector 40 and a connector 42 on an upstream branch circuit cable 38. The conductors 50 and 51 are connected through the series adapters 82, 68 and 82 and the connector 40 to the terminals 45 and 46 on the fixture connector 36. Similarly, the conductor 52 is connected through the adapters 82, 68 and 82 and the connector 40 to the two terminals 47 and 48 for supplying power in parallel to the ballast circuits 43 and 44. Thus, the electrical connections from the conductors 50–52 to the lighting fixture 35 is identical to that shown in the regular branch circuit 104 of FIG. 9. However, the three adapters 82, 68 and 82 permit controlling power in the conductor 53 downstream of the circuit 110 by means of a switch 79. Power is received into the circuit 110 from the connector 42. From here, the circuit converter adapter 82 connects the conductor 53 to the input terminal 71 in the switch adapter 68. Power between the input terminal 71 and the output terminal 75 in the switch adapter 68 is controlled by the switch 79. The other circuit converter adapter 82 then reconnects the output terminal 75 on the switch adapter 68 with the terminal 61 in the connector 40 which is in turn connected to the downstream conductor 53 in the branch circuit. This eliminates the need for constructing different switch adapters 68 in which power between different pairs of terminals may be switched.

The above-description relating to FIGS. 10–15 is intended to merely illustrate typical ways in which the basic or regular branch circuit 104 of FIG. 9 may be modified through the use of one or more of the switch adapters 68, the circuit converter adapter 82 and the circuit divider adapter 93. It will of course be appreciated that other combinations of these adapters or others may be made to achieve a desired control in the lighting system without having to physically wire the system. The lighting fixtures and the branch circuit components may all be factory wired. System flexibility is provided through the selective use of the various adapters.

In the above description, the first, second and third connectors 36, 40 and 42, the switch adapter 68, the circuit converter adapter 82 and the circuit divider adapter 93 have been described in terms of their electrical circuit properties rather than their physical dimensions or shape. The various physical designs for the connectors 36, 40 and 42 and the adapters 68, 82 and 93 which will include terminals having the above-described mating arrangements will be readily apparent to those skilled in the art. It will also be readily apparent that the branch circuit may be composed of cables 38 having the four conductors 50–53 shown in the drawings or the cables may be modified to include either additional or fewer conductors to meet power distribution requirements for any given installation. Or, the number of conductors may be greater near the main power distribution buss than at a distance. For example, near the main power distribution buss the conductors 52 and 53 of a four conductor branch circuit cable 38 may carry separate phases of a two-phase power supply. The conductor 52 may then be wired to serve all fixtures in the first half of the branch circuit. From a midpoint in the branch circuit, only three wires serve the remaining fixtures with power carried by the conductors 53. With such an arrangement, the load can be distributed equally between the two phases. Various other modifications of lighting systems embodying the spirit and the scope of the invention defined by the following claims will also be readily apparent to those skilled in the art.

What I claim is:

1. A system for lighting a floor area in a building comprising, in combination, a plurality of lighting fixtures supported by a ceiling structure to supply light to the floor area, each fixture having mounted thereon a plurality of lamps, at least one lighting circuit for energizing said lamps and a plural terminal first connector having terminal means wired to supply power to said lighting circuit, said fixtures being arranged into at least one branch circuit with a plurality of said fixtures in such branch circuit, a plurality of plural conductor branch circuit cable means, one branch circuit cable means connecting a plurality of circuits between each two adjacent fixtures in a branch circuit to distribute power to said fixtures, each branch circuit cable means having an end terminating in a second connector having first and second terminal means each connected to said plurality of conductors and an end terminating in a third connector having terminal means connected to said plurality of conductors, said first terminal means on a second connector on a cable means and said terminal means on a first connector on a fixture cooperating for connecting at least two of said conductors in such cable means to the lighting circuit in such fixture when such second and first connectors are connected together, said second terminal means on a second connector on a cable means and said terminal means on a third connector on another cable means cooperating for interconnecting corresponding conductors in such cable means when such second and third connectors are connected together, and means for applying electrical power between at least two of the cable conductors in each branch circuit.

2. A system for lighting a floor area in a building, as set forth in claim 1, and including an external switch, a switch adapter positioned between and interconnecting one of said second connectors and a preselected one of said first and third connectors, said switch adapter having terminal means for connection to said external switch for switching one circuit between said one second connector and said preselected connector, and said switch adapter having unswitched circuit means for maintaining electrical continuity in other circuits between said one second connector and said preselected connector.

3. A system for lighting a floor area in a building, as set forth in claim 2, wherein said switch adapter is positioned between said one second connector and a preselected first connector on a preselected fixture for switching power in a single circuit to said preselected fixture.

4. A system for lighting a floor area in a building, as set forth in claim 3, wherein said preselected fixture includes two circuits, at least one of said two circuits including said lighting circuit for energizing lamps in said preselected fixture, said two circuits having connections to at least two different terminal means in said preselected first connector, and wherein said switched circuit in said switch adapter includes terminal means positioned for making electrical connection simultaneously from said switched circuit to both of said two different terminal means in said preselected first connector.

5. A system for lighting a floor area in a building, as set forth in claim 4, and including a circuit divider adapter positioned between an interconnecting said switch adapter and said preselected first connector, said circuit divider adapter and said switch adapter having means for connecting said first and second connectors together, said circuit divider adapter including first terminal means for establishing an electrical connection between said terminal means on said switch adapter and the one of said two different terminal means in said preselected first connector connected to said lighting circuit in said preselected fixture and second means for establishing electrical connection with an unswitched circuit means in said switch adapter and the other of said two different terminal means in said preselected first connector on said preselected fixture whereby said external switch makes and breaks the electrical circuit to said lighting circuit connected to said one of said two different terminal means without affecting the circuit connected to said other of said two different terminal means.

6. A system for lighting a floor area in a building, as set forth in claim 5, wherein a second of said two different circuits in said preselected fixture includes a battery, means connected to said other of said two different terminal means for charging said battery, and load control means for energizing said lighting circuit from said battery when power to said other of said two different terminal means is interrupted.

7. A system for lighting a floor area in a building, as set forth in claim 4, and including a circuit converter adapter positioned between and interconnecting said switch adapter and said one second connector, said circuit converter adapter and said switch adapter having means for connecting said preselected first connector and said one second connector together, said circuit converter adapter including means interchanging two circuit connections between said one second connector and said switch adapter while maintaining electrical continuity in all other electrical circuit connections between said one second connector and said switch adapter with one of such interchanged circuit connections comprising the connection to the switched circuit in said switch adapter.

8. A system for lighting a floor area in a building, as set forth in claim 2, wherein said preselected connector is a third connector whereby said switch adapter is positioned between said one second connector and said preselected third connector, said switch adapter switching power to all fixtures in the branch circuit which receive power through said one second connector from such switched circuit, and wherein at least some of said second connectors connected to such switched circuit includes first terminal means which normally supplies power to one of said terminal means in a connected first connector which is wired to a lighting circuit.

9. A system for lighting a floor area in a building, as set forth in claim 8, and including a circuit converter adapter positioned between a first connector on a fixture and a second connector connected to said switched circuit, said circuit converter adapter having terminal means connecting said one terminal means in such connected first connector to a circuit in the branch circuit other than said switched circuit.

10. A system for lighting a floor area in a building, as set forth in claim 8, and further including a first circuit converter adapter positioned between and interconnecting said one second connector and said switch adapter and a second circuit converter adapter positioned between said switch adapter and said preselected third connector, said circuit converter adapters including means for interchanging the circuit switched by said external switch with another circuit in the branch circuit while maintaining continuity in the other circuits in the branch circuit.

11. A system for lighting a floor area in a building, as set forth in claim 2, and further including a relay having control terminals and switched terminals, means connecting said switched terminals to said switch adapter terminal means, and means connecting said control terminals to said external switch whereby said relay opens and closes said switched circuit and said external switch controls said relay.

12. A system for lighting a floor area in a building, as set forth in claim 1, and including a circuit converter adapter positioned between and interconnecting one of said first connectors and one of said second connectors, said circuit converter adapter including means for interchanging a portion of the electrical circuit connections to the fixture mounting said one first connector while maintaining continuity in other electrical circuit connections between said one first connector and said one second connector.

13. A system for lighting a floor area in a building, as set forth in claim 1, and including a circuit converter adapter positioned between and interconnecting one of said second connectors and one of said third connectors, said circuit converter adapter including means for interchanging a portion of the electrical circuit connections while maintaining continuity in other electrical circuit connections between said one second connector and said one third connector whereby the interchanged connections are connected to portions of the branch circuit receiving power through said one second connector, said one third connector and said circuit converter adapter.

14. A system for lighting a floor area in a building, as set forth in claim 1, wherein each fixture mounting a first connector includes two circuits, at least one of said two circuits including said lighting circuit for energizing lamps, said two circuits having connections of two different terminal means in such first connector, and wherein one of said first terminal means in each of said second connectors is positioned for making electrical connection simultaneously from a single circuit in a branch circuit to both of said two different terminal means in a connected first connector.

15. A system for lighting a floor area in a building, as set forth in claim 14, and including a circuit divider adapter positioned between and interconnecting a first connector on a preselected fixture and one of said second connectors, said circuit divider adapter including first terminal means for establishing an electrical connection between one of said two different terminal means on said first connector on said preselected fixture and one of said first terminal means on said one second connector and said circuit divider adapter including second terminal means for establishing an electrical connection between the other of said two different terminal means on said first connector on said preselected fixture and a different first terminal means on said one second connector whereby said two circuits in said preselected fixture are connected to separate circuits in a branch circuit.

* * * * *

UNITED STATES PATENT OFFICE
CERTIFICATE OF CORRECTION

Patent No. 4,001,571          Dated January 4, 1977

Inventor(s) Myron D. Martin

It is certified that error appears in the above-identified patent and that said Letters Patent are hereby corrected as shown below:

Column 11, line 12, after "circuit", insert -- 114 --.
Column 16, line 24, "of" should be -- to --.

Signed and Sealed this

Eighth Day of March 1977

[SEAL]

Attest:

RUTH C. MASON
*Attesting Officer*

C. MARSHALL DANN
*Commissioner of Patents and Trademarks*